United States Patent
Croci

(10) Patent No.: US 6,746,563 B2
(45) Date of Patent: Jun. 8, 2004

(54) METHOD FOR GLUING PLASTIC LABELS ON HYDROREPELLENTS CONTAINERS BY MEANS OF LABELLING APPARATUS FOR WATER BASED GLUES

(75) Inventor: Luciano Croci, Trezzano sul Naviglio (IT)

(73) Assignee: Grafiche Rekord S.R.L., Trezzano sul Naviglio (IT)

( * ) Notice: Subject to any disclaimer, the term of this patent is extended or adjusted under 35 U.S.C. 154(b) by 0 days.

(21) Appl. No.: 09/958,195

(22) PCT Filed: Feb. 3, 2001

(86) PCT No.: PCT/IT01/00049
§ 371 (c)(1),
(2), (4) Date: Oct. 3, 2001

(87) PCT Pub. No.: WO01/56893
PCT Pub. Date: Aug. 9, 2001

(65) Prior Publication Data
US 2002/0157781 A1 Oct. 31, 2002

(30) Foreign Application Priority Data
Feb. 3, 2000 (IT) .................................. PC2000A0006

(51) Int. Cl.⁷ .............................. B32B 31/00; B65C 3/08
(52) U.S. Cl. .................................. 156/327; 156/DIG. 9; 156/DIG. 35
(58) Field of Search .................... 156/60, 278, 280, 156/327, DIG. 39, DIG. 11, DIG. 13, DIG. 35, DIG. 9

(56) References Cited

U.S. PATENT DOCUMENTS

| 3,668,166 | A | * | 6/1972 | Kane et al. | 524/253 |
| 4,478,668 | A | * | 10/1984 | Gau | 156/364 |
| 5,271,793 | A | * | 12/1993 | Seifert et al. | 156/566 |
| 5,478,654 | A | * | 12/1995 | Hargis et al. | 428/457 |
| 5,672,198 | A | * | 9/1997 | Belmont | 106/31.75 |
| 5,776,604 | A | * | 7/1998 | Lu et al. | 428/343 |
| 6,517,664 | B1 | * | 2/2003 | Dronzek, Jr. | 156/328 |

FOREIGN PATENT DOCUMENTS

WO   WO 9919412   *   4/1999   ............ C09J/5/02

OTHER PUBLICATIONS

Merriam–Webster's collegiate dictionary, 1999, Merriam–Webster, Incorporated, tenth edition, p. 1001.*

* cited by examiner

*Primary Examiner*—Richard Crispino
*Assistant Examiner*—Sing P Chan
(74) *Attorney, Agent, or Firm*—Synnestvedt & Lechner LLP

(57) ABSTRACT

Method for gluing plastic labels (15) formed of a film (12) of BI-oriented polypropylene covered on each from a layer of acrylic material (13,14), to hydrorepellent containers by using application apparatus for water based glue paper labels; one of layers (13,14) is printed by means of inks (16) for non absorbing materials, covered by a layer of overprinting paint (17).

11 Claims, 3 Drawing Sheets

METHOD FOR GLUING PLASTIC LABELS ON HYDROREPELLENTS CONTAINERS BY MEANS OF LABELLING APPARATUS FOR WATER BASED GLUES

FIELD OF THE INVENTION

The present invention relates to processes allowing for the application of plastic labels onto hydrorepellent containers of the type, for example, made of plastic, metal or glass, using apparatus designed originally for sticking traditional paper labels onto substrates using water based glues. The processes include further that said plastic labels be printed with inks for non absorbing supports, wherein the inks contain oxidising additives which tend to effect rapid drying thereof, and the inks tend to be stable when in contact with the water based glues.

SUMMARY OF RELATED ART

Modem processes for sticking paper labels to containers of various type use machines or apparatus which employ, generally, a so-called "label reservoir", which comprises ordered piles of overlaid and pre-cut labels suitably placed therein to contain them on the apparatus or sticking machines. Within such machines or apparatus, the labels are taken from the reservoir by a picking means and carried towards rolls wetted by glue and a carousel provided with pads suitable to spread the glue, in example vinyl one, on the back of the label. The glue is drawn from tanks, the so-called "glue reservoirs" of the application machines or apparatus. The labels, wetted by glue, are then transported to containers onto which they are applied by means of an application mechanism generally comprising pincers which take up the labels and lay them down on the surface of the containers. The label machines or apparatus are also provided with means, such as pads, for applying suitable pressure to the applied label and making uniform the adhesion of the label to the container.

The types of conventional apparatus for the application of labels as described above are denominated "wet type" or "water based type", as compared to "dry type" machines which provide for the application of labels having on the rear side an adhesive (self-adhesive labels). In "dry type" machines the label reservoir is made of rolls of paper web with silicone on which the labels to be applied on the containers are pre-cut. Examples of "dry-type" machines and apparatus are described in the documents U.S. Pat. No. 3,278,359 and U.S. Pat. No. 4,626,314.

From an industrial point of view, the use of "wet type" apparatus to apply labels tends to be advantageous over the use of "dry type" apparatus in that "wet type" apparatus allows for the high speed application of labels with less costs associated therewith. The basic material of the labels is paper of various characteristics. The printing of such label is made on the side at view, (where as the glue is applied on the rear side) according to the conventional techniques for sheets or rolls and the employed ink and printing techniques are of the traditional type, The labels reservoir of the apparatus or machines of the "wet type" is, as aforesaid, normally made of pre-cut and pre-printed stacks of labels.

An available technique of the prior-art for the application of plastic labels to containers consists in adapting specific machines or apparatus of the "dry type" to apply labels that are of the self-adhesive type. For example, documents EP 0377384 and U.S. Pat. No. 4,601,771 describe the fundamental characteristics of said apparatus for the application of labels by means of a pressure on the container.

However, in comparison to wet type apparatus for the application of paper labels, conventional dry type, self-adhesive plastic label apparatus tends to suffer the drawbacks of having a lower speed of application and higher costs associated therewith. Additional costs associated with the dry type, self-adhesive methods arise, for example, due to: (a) the time and special machines needed to prearrange self-adhesive labels on rolled webs of paper covered by silicone and wound on a core of card board, plastic or metal (the labels used in apparatus of the wet type do not need any support and need not be wound), (b) the costs of the band with silicone and of the core themselves, (c) the costs associated with disposal of waste material produced in dry type machines, and (d) the increased technical difficulty of manufacturing the supporting material which must be sprayed with glue on one face.

Other known methods for the application of plastic labels involves winding label strips of a length greater than the diameter of the container onto which they are applied, whose end overlapping zones are glued by means of thermoplastic glues, as illustrated in FR 25003093 e U.S. Pat. No. 4,632, 721. In such methods, the labels are printed by offset techniques, by flex or screen printing, or by typography in webs or sheets, whereas the cut of the labels is made by means of rotary or plane cutting machines. However, a drawback of the methods using winding strips glued at their ends by thermoplasticity is that such methods tend to be useful only in the application of labels to substrates of a regular form (parallelepiped or cylindrical).

Another conventional technique for the application of plastic labels to plastic containers is "In Mould Labelling" (IML), which consists in positioning in advance the early printed plastic label in the moulds which give form to the containers; an example of such a process is disclosed in EP 0313400. In such methods,when a tube (parison) of melting plastic is pressed by the moulds to form a container, the label in contact with said tube, by means of heat and pressure, mixes within the plastic mass of the surface of the forming container, appearing eventually as a single item with the whole container.

Unfortunately, the production process of pre-labelled containers by means of the IML method has very high costs due to the fact that the moulds allow a low speed of manufacturing of container. Furthermore, the application of the label at the interior of the mould increases considerably the costs because of the consequent high rate of rejection. An additional drawback of the IML is that the labelling is physically incorporated within the external surface of the container and is therefore not removable: this renders the resulting containers unusable for different uses requiring relabelling.

Another conventional method of application of plastic labels on plastic, glass or metal containers is the one described in patent application WO 99/19412. Such method consists of applying to a plastic label a layer of hydrophilic material, for example, an acrylic layer. WO 99/19412 describes thirty-eight examples of application of labels. In each example, the material of which the label is made, the type of hydrophilic material, and the type of component that is used to activate the adhesion of the acrylic layer to the container are changed. Among thirty-eight examples, only four give good or excellent results, namely, examples 30, 33, 36 and 37. Example 30 is done with a white (non-clear) label of polyethylene. Example 33 is done with a white (non-clear) label of polypropylene, and examples 36 and 37 are done with clear labels of polypropylene. In examples 30 and 36, labels are applied on containers of polyethylene and in examples 33 and 37 labels are applied on glass containers.

Examples 30 and 33 use water to activate adhesion of the hydrophilic layer on the container. Example 36 uses a starch and styrene maleic anhydride based adhesive to glue the polypropylene label to a polyethylene container. Example 37 uses a water resin based adhesive to glue the polypropylene label to a glass container.

The method described in WO 99/19412 presents difficulties in industrial application. Labels of a generic polypropylene are hardly machineable, labels with only a layer of acrilic material, on a unique face, loaded in well arranged piles, are not able to slip one on the other one. Adhesive to be applied must be chosen in function of the material of the container on which the label must be applied. Technicians are obliged to review plants for applying labels for every type of material of which is fabricated each container and each label. Results are uncertain. The method described in WO 99/19412 is not applicable to traditional apparatus for paper labels.

It will appear clearer in the following description how the present invention eliminates and overcomes the aforementioned drawbacks, making possible the application of plastic labels to hydrorepellent containers, the labels suitably conditioned and printed by means of apparatus normally designed for paper labels for water based glues.

DESCRIPTION OF THE INVENTION

The present invention allows for the use of machines and apparatus of the "wet type", normally adopted for the application of paper labels with water based glues, to apply plastic labels to hydrorepellent of metal, plastic or glass containers. The invention is made possible by the combination of suitable treatment of the surface of the plastic label, in order to make them receptive either of inks containing oxidising additives for a quick drying either of water based glues.

The process of the invention provides also that the water based glue suitable to stick said labels to hydrorepellent containers have specific chemical-physical characteristics within well defined ranges. The same process allows, obviously, the application of plastic labels to any container, independently from the material of which it is made, as for example cardboard or waxed cardboard, and of any shape.

According to the invention, by substituting the paper labels reservoir, with the plastic labels treated in accordance with the following description and the reservoir of water based glue, with a reservoir of glue made of a solution of resinous substances, containing a terpolymer, having a viscosity of $(70.000 \pm 10.000)$ mPas and a pH of $5{,}5 \pm 1{,}5$, while the dry residual must be within the range of $(46 \pm 3)\%$, the apparatus or traditional machines for paper labels are made perfectly compatible with the plastic labels, which will be applied to the containers with the same process and at the same speed.

The advantages resulting by such a method, beyond the already aforementioned ones, are evident by the flexibility that said wet type apparatus and machines offer, said flexibility being the same as for plastic labels: it derives that with the same type of apparatus or machine operations which were before not compatible are made possible by means of the invention. As already said, the use of wet-type machines and apparatus for the application of plastic label to hydrorepellent containers allow to:

Obtain high speed of application vis-a-vis the apparatus for self-adhesive labels;

Obtain a readiness and a reduction of costs of production of the labels, either for the absence of adhesive on one of the face, either for the absence of supports with silicone winded on a core of cardboard or metal, strongly more expensive than the labels without glue and stored in ordered pile.

Furthermore, by means of the method of the present invention it is possible to print the plastic film constituting the label on the side susceptible to be glued, in case of transparent labels. This improves the quality of the characteristics of the label because the printed side does not come in contact with the user or with external agents and therefore it resists to possible scratches and abrasions or chemical agents. Such characteristic takes an important place for containers of substances of a particular danger or value, for the printed side not being in contact with the outside avoids that the printed information of danger or indicating the content of particular substances be easily damaged, sometimes till to make them unreadable.

The invention is made possible by means of combination of operations as described in the following:

The plastic label is covered on both sides by an acrylic aqueous solution purged from chlorine. Acrylic cover on both faces of label allow slipping of the labels put in piles, as well as gluing of them to hydrorepellent containers by means of water based glue; the basic film constituting the support of the label is made of polypropylene biaxially oriented. Said support of biaxially oriented Polypropylene guaranties dimensional stability, homogeneous optical qualities, high breaking strength, higher machineability.

The two opposite layers of acrylic solution, suitably dried and laminated, are ink receptive or water based adhesives receptive; in order to make the anchoring of ink on the acrylic layer it is necessary to use inks for non absorbing supports which are added with particular compounds of salts complex, which when in contact with the water base of the glue oxidise by freeing hydrogen. The label so formed can be printed either on the face external to the container, or in case of transparent labels, on the face to be glued.

When on the face to be glued to the container, the printing is performed using inks for non absorbing materials added with reactive dryers of the type known in commerce as "Grafo Drier."

The printing by non absorbing inks added with salts complex, for example of the type known in commerce as Grafo Drier, which can be performed by various printing techniques on plastic by conventional or digital sort, is subsequently covered by a protective overprinting water based paint, made of a dispersion of an acrylic polymer. The overprinting paint tends to lessen the chance that the inks of the printed labels, when stacked in pile one over the other, are removed or damaged. Said paint improves, also, the anchoring of the printed ink to the water based glue of the type used for the application of the label to the hydrorepellent containers.

The invention is better understood by means of figures, where:

Figure 1:
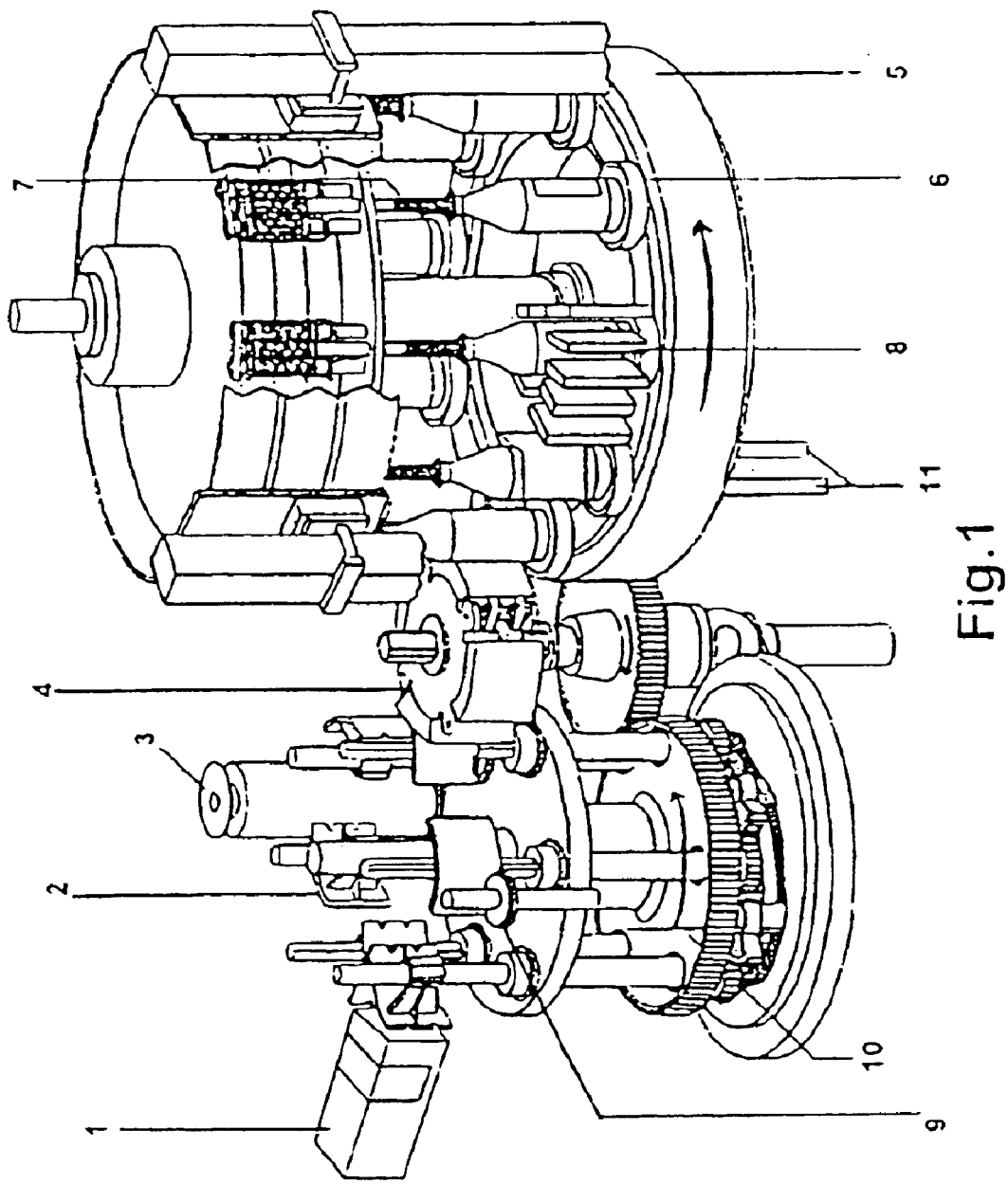
FIG. 1 illustrates a typical wet type apparatus for applying paper labels by means of water based glues.
Figure 2:
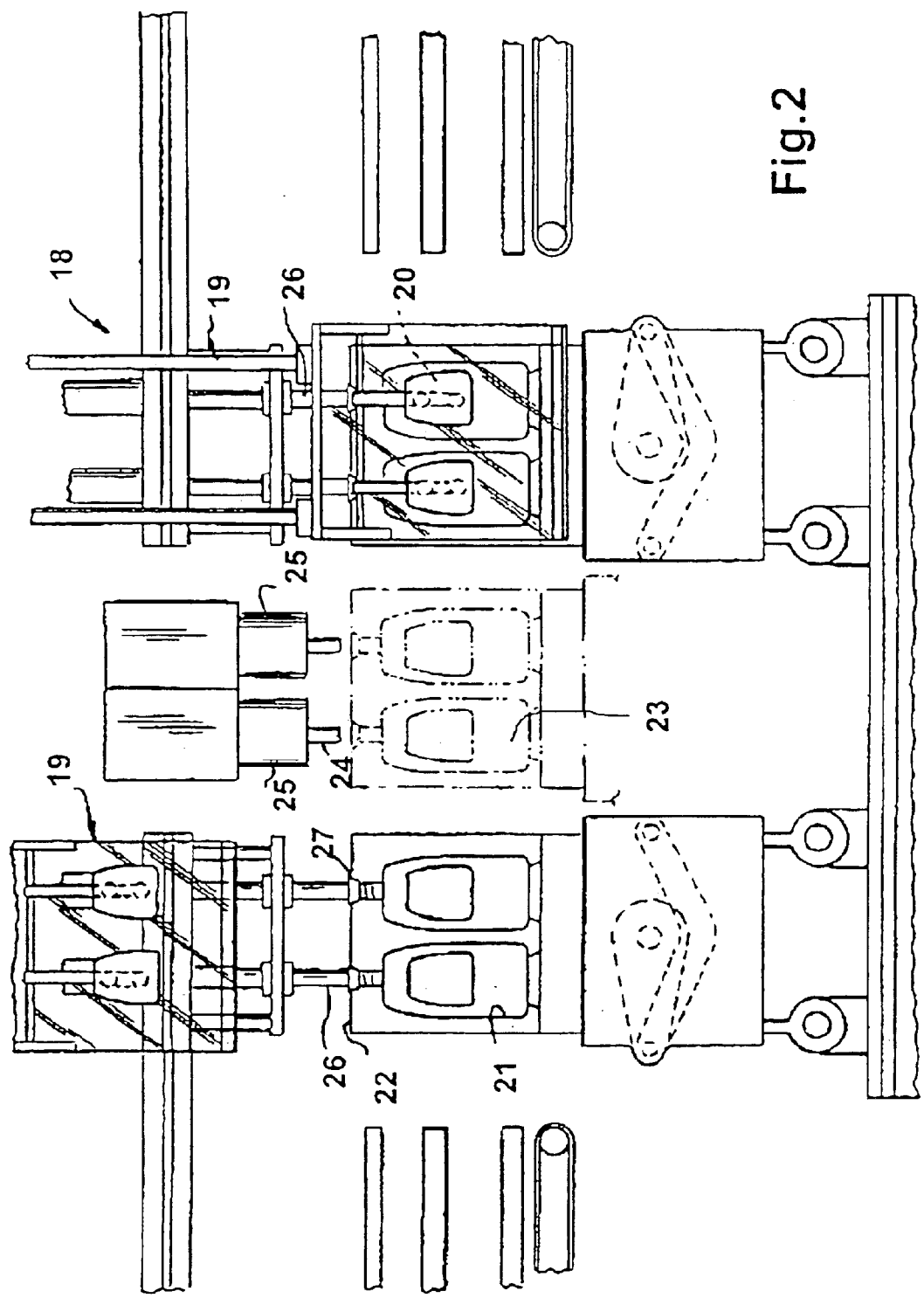
FIG. 2 illustrates the application process of plastic labels known as In Mould labelling.
Figure 3:
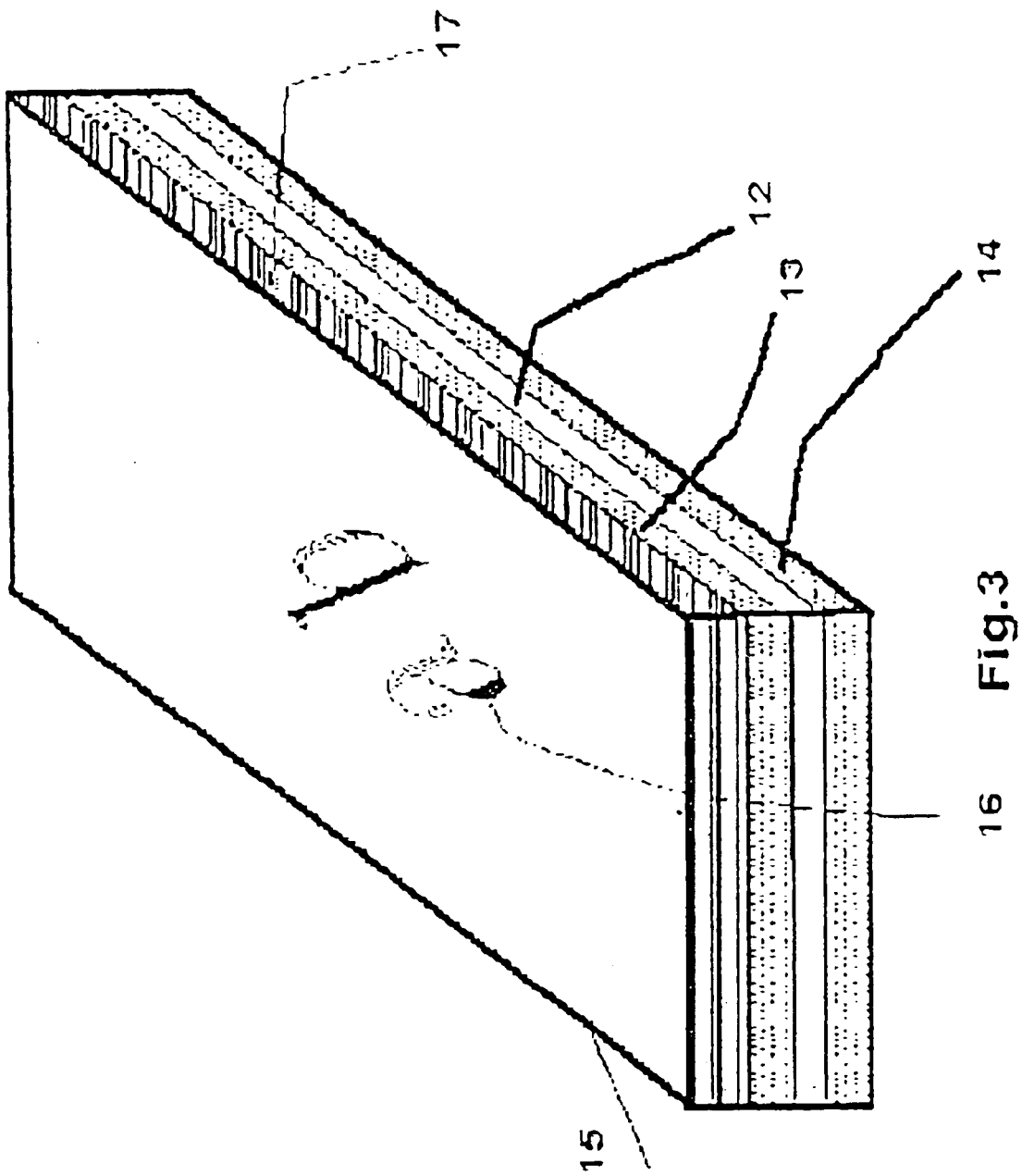
FIG. 3 illustrates the characteristics of the plastic label used for embodying the method of the invention.

The apparatus (18) for the application of plastic labels by the In Mould Labelling comprises a pair (19) of accessories for the labelling in moulds which are used for positioning 10 the labels (20) within the mould cavity (21) before that the two halves of the mould (22) clamps around the parison, so that the labels are thermally attached to the thermoplastic material forming the container (23). Parison (24) are extruded from heads (25) for being blown into cavities (21) by means of pins (26) entering into orifices (27).

Whereas a typical apparatus of the wet type consists of a reservoir (1) of labels of paper therefrom the said label stored in ordered stacks are extracted in succession. By means of gluing spades (2) the labels come in contact with a gluing cylinder (3), which distributes the water based glue on the side to be stuck; A pincers arrangement (4) picks up the moistened labels to bring them to table (5) which supports the containers arranged on dishes (6) and thereon centred by means of centring tulips (7). Once applied, the labels are further tensed by means of smoothing pads (8) in order to uniform the gluing to the container.

These apparatus are also equipped by additional devices for dating (9). The spades (2) belong to a carousel in oil bath (10). The table (5) supporting the containers are provided with means for lubricating (11).

The plastic label (15) suitable for the method in object is made of a BI-oriented polypropylene layer (12) covered on each of its faces by an acrylic material (watery-acrylic solution) (13) (14). The acrylic material has the double result of eliminating static electricity and favouring the anchoring of inks. The labels are, before being placed in the reservoir (1), printed on the external side not to be glued or, when transparent, on the side to be glued by means of inks(16) containing oxidising additives.

The printed side is then covered by a layer of overprinting paint (17) of the type above mentioned; so treated the label (15) is receptive of water based glues. In order to perform the application of the label (15) to hydrorepellent container at a grade of adhesion equivalent to the self-adhesive labels it is necessary that the glue be a water resin based glue, containing a terpolymer, of a viscosity within the range of (70.000±10.000) mPas and of a pH of 5.5±1.5, while the dry residual must be in the range of (46±3)%. Said glue will be spread without alteration of the apparatus by means of the gluing cylinder (3).

It is obvious that the claimed method encompasses various embodiments, either for varying the labels printing or for their application to different type of containers, which might require adaptation of the application mechanical means. Nevertheless, said adaptation cannot be made without adopting the inventive path of the present method.

What is claimed is:

1. A method for retrofitting an application apparatus for attaching paper labels to a substrate using water-based-glues to produce an application apparatus for gluing a polypropylene label to a hydrorepellant container, said method comprising the steps of:

providing an application apparatus for attaching paper labels to a substrate using water-based-glues comprising a paper labels reservoir and a reservoir of water-based glues for paper labels;

substituting said paper labels reservoir with a label reservoir containing plastic labels, said plastic labels comprising bi-axially oriented polypropylene labels having a side to be glued and an other side, said side to be glued being covered with a first layer of an acrylic material and said other side being covered with a second layer of an acrylic material, one of said first and second layers of acrylic materials comprising a printed layer of ink for non-absorbing materials, said ink containing at least one additive comprising an oxidizing compound salt, said printed layer being covered by a layer of overprinting paint that is receptive of water based glues; and substituting said reservoir of water-based glues for paper labels with a glue reservoir containing a resin-containing water-based glue, said resin-containing water-based glue comprising a terpolymer and having a viscosity of 70.000±10.000 mPas at 20° C., a pH of 5.5±1.5 and a dry residual of 46±3%.

2. The method of claim 1 wherein said polypropylene labels are opaque and said second layer of acrylic material comprises said printed layer of ink for non-absorbing materials.

3. The method of claim 1 wherein said polypropylene labels are transparent.

4. The method of claim 3 wherein said first layer of acrylic material comprises said printed layer of ink for non-absorbing materials.

5. The method of claim 3 wherein said second layer of acrylic material comprises said printed layer of ink for non-absorbing materials.

6. A method for gluing a polypropylene label to a hydrorepellant container comprising the steps of:

retrofitting an application apparatus for attaching paper labels to a substrate using water-based-glues according to the method of claim 1 to produce an application apparatus for gluing polypropylene labels to hydrorepellant containers; and using said retrofitted application apparatus to glue a polypropylene label to a hydrorepellant container.

7. A method for gluing a polypropylene label to a hydrorepellant container comprising the steps of:

providing an application apparatus comprising:

a label reservoir containing plastic labels, said plastic labels comprising bi-axially oriented polypropylene labels having a side to be glued and an other side, said side to be glued being covered with a first layer of an acrylic material and said other side being covered with a second layer of an acrylic material, one of said first and second layers of acrylic materials comprising a printed layer of ink for non-absorbing materials, said ink containing at least one additive comprising an oxidizing compound salt, said printed layer being covered by a layer of overprinting paint that is receptive of water based glues; and a glue reservoir containing a resin-containing water-based glue, said resin-containing water-based glue comprising a terpolymer and having a viscosity of 70.000±10.000 mPas at 20° C., a pH of 5.5±1.5 and a dry residual of 46±3%; and using said application apparatus to glue a polypropylene label to a hydrorepellant container.

8. The method of claim 7 wherein said polypropylene labels are opaque and said second layer of acrylic material comprises said printed layer of ink for non-absorbing materials.

9. The method of claim 7 wherein said polypropylene labels are transparent.

10. The method of claim 9 wherein said first layer of acrylic material comprises said printed layer of ink for non-absorbing materials.

11. The method of claim 9 wherein said second layer of acrylic material comprises said printed layer of ink for non-absorbing materials.

* * * * *